No. 709,779. Patented Sept. 23, 1902.
A. M. KIDD & W. A. GIBBONS.
PIPE COUPLING.
(Application filed Dec. 17, 1901.)
(No Model.)
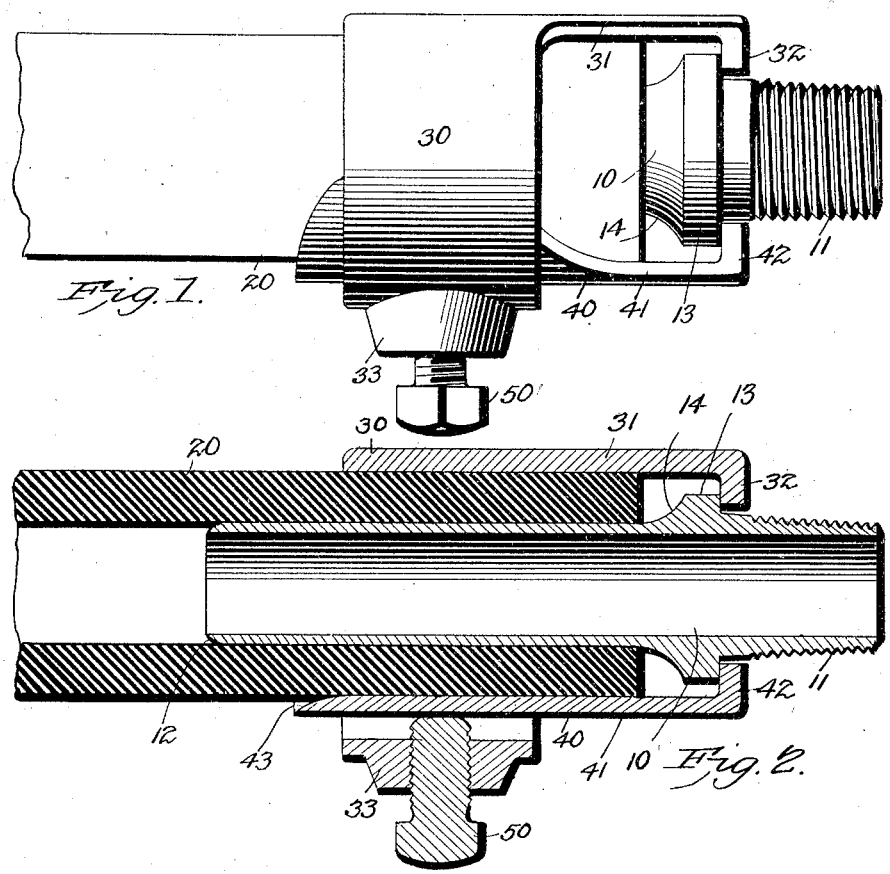
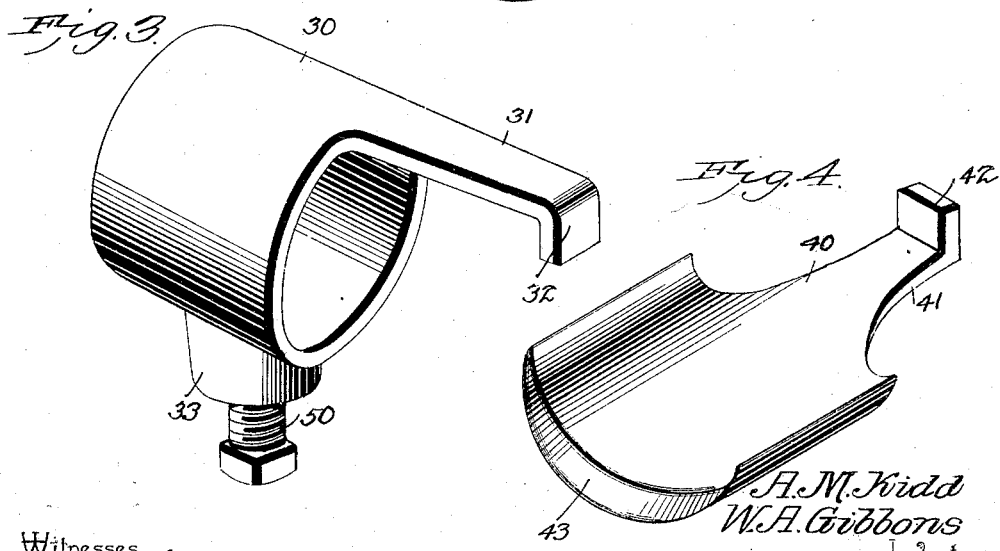
Witnesses
E. J. Stewart
S. M. McColl
Inventors
A. M. Kidd
W. A. Gibbons
by C. A. Snow & Co.
Attorneys

UNITED STATES PATENT OFFICE.

ARCHIE M. KIDD AND WALLACE A. GIBBONS, OF JOPLIN, MISSOURI; SAID KIDD ASSIGNOR TO SAID GIBBONS.

PIPE-COUPLING.

SPECIFICATION forming part of Letters Patent No. 709,779, dated September 23, 1902.

Application filed December 17, 1901. Serial No. 86,278. (No model.)

*To all whom it may concern:*

Be it known that we, ARCHIE M. KIDD and WALLACE A. GIBBONS, citizens of the United States, residing at Joplin, in the county of Jasper and State of Missouri, have invented a new and useful Pipe-Coupling, of which the following is a specification.

This invention relates to hose-coupling for coupling steam-hose; but it may be used for coupling a flexible hose to a street-washer or other faucet or for coupling two sections of metal pipe.

The object of the invention is to provide a coupling of simple construction which can be rapidly adjusted, which can be used for any size pipe, and one which may have its sides flattened without interfering with the removal of the coupling.

Figure 1 of the accompanying drawings represents a side elevation of this improved coupler applied to a rubber hose. Fig. 2 represents a longitudinal vertical section thereof. Fig. 3 represents an enlarged detail view of the outer clamping member. Fig. 4 represents a similar view of the inner clamping member.

The same reference-numerals indicate corresponding parts in all the figures.

The coupling member 10 herein illustrated is provided at one end with an external screw-thread 11 and is preferably rounded off at its opposite end at 12 to avoid breaking or cutting of the hose. This stem 10 has an annular shoulder or rib 13 disposed adjacent to its screw-threaded end. The shoulder edge next the screw-threaded end projects in a straight line at right angles therefrom, and the other side of this shoulder 13 is beveled at 14, against which the hose or other pipe 20 abuts. A tight joint is thus formed between the stem 10 and the hose 20 by forcing the hose tightly up against the beveled face 14 of the shoulder 13. After the hose is placed in this position on the stem 10 a clamp, hereinafter described, is placed over the hose 20 and clamps it firmly to the stem 10. This clamp comprises an encircling band member 30 and an inner clamp member 40 and a screw 50 for clamping said members in position. The outer or band member is in the form of a band 30 of any desired size and is provided with an arm 31, having an inturned flange 32. This band 30 is provided, at a point preferably opposite the arm 31, with an external shoulder 33, having an internally-screw-threaded aperture extending therethrough and through the wall of the band 30. This aperture is adapted to receive the clamping-screw 50, which operates to hold the two clamping members 30 and 40 tightly against the hose 20 and clamp it to the stem 10. The inner clamp member 40 is shown in the form of a semicircular or arc-shaped plate provided with an integral arm 41, having an inturned flange 43. This arm 41 corresponds with the arm 31 of the other clamping member 30. The member 40 is adapted to rest on its inner face on the hose 20 and is provided with a flared edge 43, which prevents any possibility of the hose being cut or injured thereby. This member 40 is disposed inside the band member 30, between it and the pipe 20, and preferably at a point opposite the clamping-screw 50, so that the screw bears against the plate 40, which affords a large clamping-surface for holding the pipe in contact with the coupling-section, as 10. The flanges 32 and 42 of the arms 31 and 41 when the clamping members are in adjusted position for clamping a pipe to the stem engage the straight edge of the shoulder 13 on said stem 10 and hold the pipe 20 against longitudinal displacement and prevent any liability of the stem being blown out when used in coupling steam-hose.

The construction of our clamp in two separate and distinct members, each of which is provided with a device for engaging a coupling member, produces a clamp which may be applied to any form or size of pipe-coupling and which is capable of clamping or compressing any-sized pipe or hose to said coupling. The members, being independent of each other and each provided with a coupling-engaging device, may be swung or tilted at either end to fit various-sized pipes and couplings.

In joining two pipes together another coupling member, (not shown,) similar in construction to the member 10, is clamped in the other pipe to be joined to the pipe 20 by a clamp like the one just above described, and this coupling member is fastened to the end 11 of the stem 10 in any desired manner. The stem shown is provided with an externally-screw-threaded end 11, over which an internally-screw-threaded coupling member is adapted to be screwed.

While we have shown and described a particular form of coupling member, it will readily be seen that any kind of coupling member having a shoulder may be used without departing from the scope of this invention.

We claim as our invention—

1. A clamp for hose-coupling comprising an encircling band provided with an arm having an inturned flange, an inner clamp member provided with an arm having an inturned flange, and means to force the inner member against the hose to be clamped.

2. A clamp for hose-couplings comprising an encircling band provided with an arm having an inturned flange, an inner clamp member provided with an arm having an inturned flange, and means carried by the encircling band to force the inner member against the hose to be clamped.

3. A clamp for a hose-coupling comprising an encircling band provided with an arm having an inturned flange, a shoulder on said band having an internally-screw-threaded aperture therein, an inner clamp member provided with an arm having an inturned flange, and a clamping-screw adapted to extend through said aperture and engage said inner member thereby compressing it firmly against the hose to be clamped.

In testimony that we claim the foregoing as our own we have hereto affixed our signatures in the presence of two witnesses.

ARCHIE M. KIDD.
WALLACE A. GIBBONS.

Witnesses:
C. S. WALDEN,
W. S. BOYD.